J. G. OLIVER.
MACHINE TOOL.
APPLICATION FILED FEB. 19, 1916.
1,227,822.
Patented May 29, 1917.
2 SHEETS—SHEET 1.
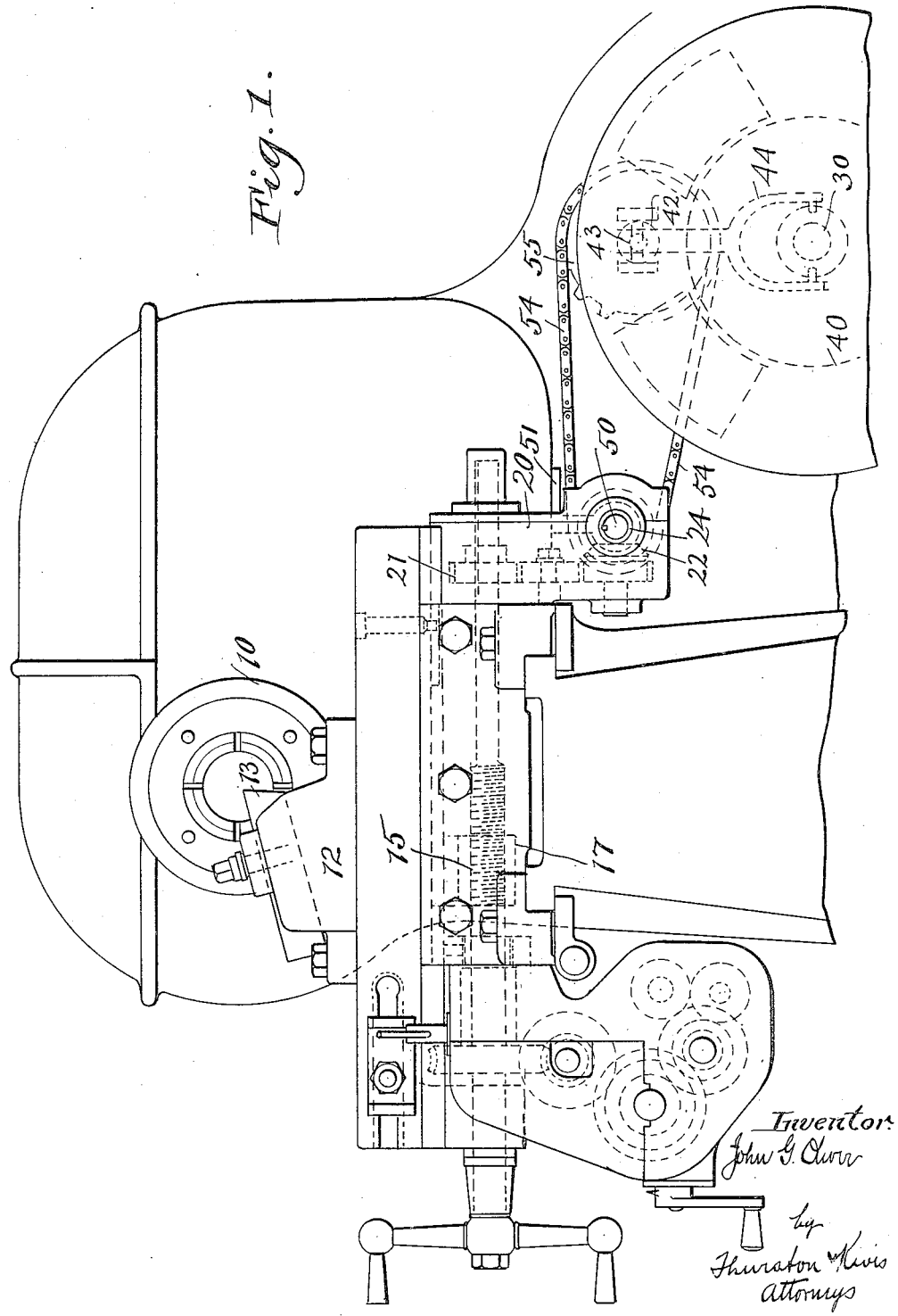

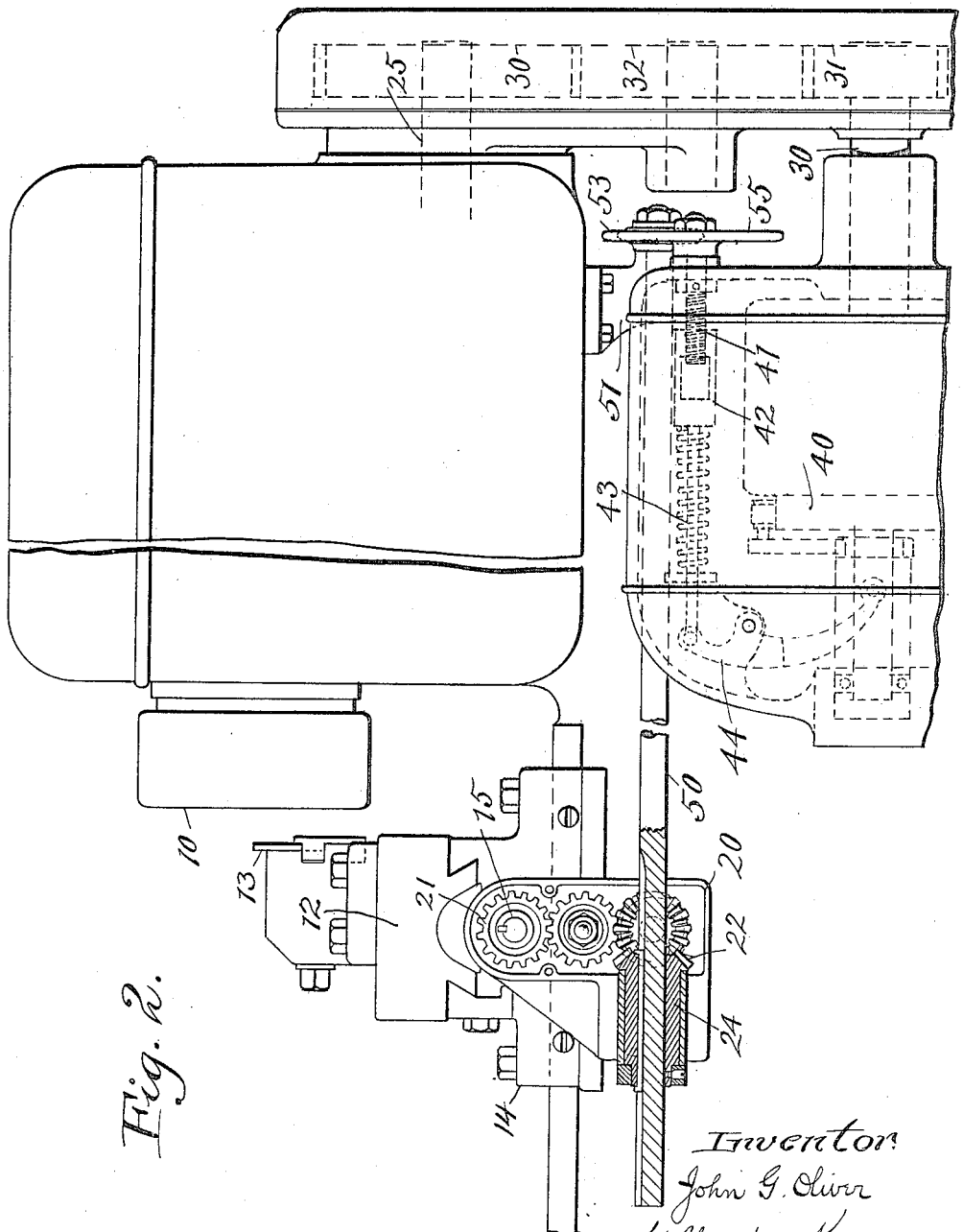

UNITED STATES PATENT OFFICE.

JOHN G. OLIVER, OF CLEVELAND, OHIO, ASSIGNOR TO BARDONS AND OLIVER, A PARTNERSHIP COMPRISING GEORGE C. BARDONS AND JOHN G. OLIVER, OF CLEVELAND, OHIO.

MACHINE-TOOL.

1,227,822.  Specification of Letters Patent.  Patented May 29, 1917.

Application filed February 19, 1916. Serial No. 79,231.

*To all whom it may concern:*

Be it known that I, JOHN G. OLIVER, a citizen of the United States, residing at Cleveland, in the county of Cuyahoga and State of Ohio, have invented a certain new and useful Improvement in Machine-Tools, of which the following is a full, clear, and exact description.

This is an improvement in machine tools, such as lathes, which are provided with a live spindle to which the work may be fixed, and with a tool holding slide movable transversely with respect to said live spindle for the purpose of carrying the tool toward or from the axis of the rotating spindle.

The invention is of particular practical value when the machine tool is used for cutting off pieces from a stock rod fixed to the live spindle.

The efficiency of a machine of this sort is measured by the speed at which it does its work. If, when the tool begins to cut off a piece from a stock rod fixed to the live spindle, said rod is rotating at a rate such that the surface speed of the work against the tool is as fast as desired,—which, generally speaking, is as fast as the tool will stand,— it is evident that the surface speed of the work against the tool will be reduced as the tool cuts its way toward the center of the stock rod, provided the rate of rotation of the stock rod remains the same. The result of this reduction of the speed of surface contact of the work against the tool is that the tool will not cut as fast as it is capable of cutting. The object of this invention is to prevent, in a considerable degree, this diminution in the efficiency of the machine and its tool; and this result is accomplished by providing the machine with means which act automatically to increase the rate at which the work will be turned as the tool cuts its way toward the axis of the stock rod.

In the drawing Figure 1 is an end view of a lathe equipped with the invention, and Fig. 2 is a side view of so much of said lathe as is necessary to disclose the invention.

The drawing shows, with as much detail as is necessary, an ordinary lathe, and an ordinary variable speed electric motor which is connected with the lathe in any suitable way, as through the gears 31, 32, 33, for the purpose of driving said lathe.

Referring particularly to the lathe 10 represents the rotatable live spindle; 12 a transversely movable tool slide adapted to have a cutting off tool 13 secured to it; 14 represents the main carriage which is slidably mounted upon the frame work of the machine, and is movable in a path parallel with the axis of the live spindle; and it is upon this carriage that the tool slide is mounted. 15 represents the feed screw of the tool slide. This is supported upon the tool slide in such wise that it may be rotated, but it moves endwise with the tool slide; and it goes through a nut 17 which is fixed to the carriage. All of the above named parts are well understood parts of a lathe; as is also the mechanism through which this tool slide feed screw may be rotated as desired, and with the result of moving the slide toward or away from the axis of the spindle 10.

In a box 20 fixed to the main carriage is a gear train of which the receiving terminal member is a spur gear 21 which is mounted upon and has a tongue and groove connection with the feed screw 15. The other terminal member of this gear train is a bevel gear 22 which is formed as a part of a sleeve 24, which sleeve is rotatably mounted in but is prevented from moving endwise with respect to the box 20.

Referring now to the motor, it is *per se* of usual construction. Its armature 40 is so connected with the armature shaft 30 that it may move endwise thereon, but must rotate in unison with said shaft. A feed screw 41 is mounted in the motor casing; and on it is a non-rotatable nut 42 which is connected by a link 43 with a lever 44 that is so connected with the armature, that, as the lever rocks, the armature will be moved into or out of the field of the motor, with the result of varying the speed at which the armature and its shaft 30 will turn. These are well understood parts of a certain type of variable speed motor.

We come now to the added parts which cause the automatic variation in the speed of the motor, and consequently the speed of the lathe. A shaft 50 is rotatably mounted in such wise that it can have no endwise movement. Near one end it is mounted in a fixed bracket 51; while its other end is supported by and goes through the sleeve 24 and has a tongue and groove connection therewith. On one end of this shaft 50 is a sprocket wheel 53 which is connected by means of a sprocket chain 54 with a sprocket wheel 55 fixed to the outwardly projecting end of the feed screw 41.

From the foregoing it is evident that, regardless of the position of the main carriage of the lathe, motion will be transmitted from the feed screw of the tool slide through the described train of mechanism to the armature positioning screw 41 of the motor. The position of the armature of the motor with respect to its field is determined therefore, by the position of the tool slide with respect to the axis of the live spindle. As the feed screw for the tool slide turns to move said slide toward the plane which contains the axis of the live spindle, the armature controlling screw of the motor will be turned in the direction such as will cause the armature to move into the field of the motor, and thereby increase the speed of the motor. This obviously will correspondingly increase the speed at which the live spindle is turned, and also the speed at which the tool slide is moved toward the axis of the live spindle. Therefore, if, when the cutting off operation begins the live spindle is being turned through the lathe mechanism and by the motor at a sufficiently high rate of speed to cause the tool to cut about as fast and as deep as it can, then as the tool slide is moved toward the vertical plane in which the axis of the live spindle lies, such movement being induced by the turning of the feed screw, the rate at which the spindle is rotated will be gradually increased; with the result that the tool will continue to do its work efficiently, will do substantially all the work it can do as it works its way toward the axis of the rod which is being cut off, and with the result that the cutting speed of the tool is kept approximately uniform.

Having described my invention, I claim:

1. The combination of a lathe having a rotatable spindle and a transversely movable tool slide, mechanism by which the tool slide may be moved, a variable speed electric motor having a longitudinally movable armature mechanism by which the said armature may be moved longitudinally, and means connecting the mechanism for moving the slide with the mechanism for moving the said armature of the motor, the said means including a sliding connection with the mechanism which operates the slide.

2. The combination of a lathe having a rotatable spindle and a transversely movable tool slide, a variable speed electric motor having a longitudinally movable armature and mechanism which includes a rotatable member for moving said armature, a shaft operatively connected with said rotatable armature controlling member, and means intermediate of the feed screw of the tool slide and said shaft for turning the latter.

3. The combination of a lathe having a rotatable live spindle, a carriage movable in a path parallel with the axis of the live spindle, a transversely movable tool slide mounted on said carriage, a feed screw on the tool slide for moving it, a gear train mounted on the carriage, one terminal member of which gear train embraces and has a tongue and groove connection with said tool slide feed screw, a rotatable shaft which goes through the other terminal member of said gear train and has a sliding tongue and groove connection therewith, a variable speed electric motor, armature positioning mechanism for said motor, and mechanism intermediate of the last mentioned shaft and said armature positioning mechanism by which the latter is operated.

In testimony whereof, I hereunto affix my signature in the presence of two witnesses.

JOHN G. OLIVER.

Witnesses:
M. J. LLOYD,
H. W. GEORGE.